United States Patent [19]
Coco et al.

[11] Patent Number: 4,474,694
[45] Date of Patent: Oct. 2, 1984

[54] MODIFIED PROTEIN ADHESIVE BINDER AND METHOD OF PRODUCING

[75] Inventors: Charles E. Coco, St. Louis; Paul M. Graham, Ballwin, both of Mo.; Thomas L. Krinski, Granite City, Ill.

[73] Assignee: Ralston Purina Company, St. Louis, Mo.

[21] Appl. No.: 440,111

[22] Filed: Nov. 8, 1982

[51] Int. Cl.³ ............................................... C07G 7/00
[52] U.S. Cl. ............................. 260/123.5; 260/112 R; 426/656; 106/124; 106/154.1
[58] Field of Search ..................... 260/123.5, 112 R; 106/154 R, 124

[56] References Cited

U.S. PATENT DOCUMENTS

| | | | |
|---|---|---|---|
| 2,518,666 | 8/1950 | Damschroder et al. | 260/123.5 X |
| 2,862,918 | 12/1958 | Meyer et al. | 260/123.5 |
| 2,932,589 | 4/1960 | Meyer et al. | 260/123.5 X |
| 3,720,765 | 3/1973 | Miller | 260/123.5 X |
| 3,764,711 | 10/1973 | Melnychyn et al. | 260/123.5 X |

*Primary Examiner*—Howard E. Schain
*Attorney, Agent, or Firm*—Virgil B. Hill

[57] ABSTRACT

A modified vegetable protein adhesive binder and a process for producing the same is disclosed wherein an alkaline protein dispersion is formed of the protein material and said dispersion is treated with a reducing agent in an amount sufficient to react with the disulfide bonds of the protein material in said dispersion. Initial treatment of the protein material with a reducing agent is followed by reaction of the treated dispersion with a carboxylic acid anhydride such as dicarboxylic acid anhydride, preferably phthalic anhydride in an amount sufficient to modify the protein material such that resultant alkali dispersions of the modified unhydrolyzed protein material have a relatively high viscosity but when used in paper coating compositions containing pigment and other materials such as latex produce relatively low and desirable coating viscosities. Improvements in pick strength, gloss, water holding and ink receptivity of coatings produced with the modified binder of the present invention is achieved.

33 Claims, No Drawings

MODIFIED PROTEIN ADHESIVE BINDER AND METHOD OF PRODUCING

BACKGROUND OF THE INVENTION

This invention relates to a modified vegetable protein adhesive binder and a process for producing the same.

Vegetable protein materials are well known as adhesive binders for pigment containing coatings that are used for the coating of paper. The pigment containing coatings provide the paper with a desirable finish, gloss, and smoothness. The functions of the pigment in the coating are to fill in the irregularities of the paper surface and to produce an even and uniformly absorbent surface for printing. The adhesive functions to bind the pigment particles to each other as well as to the surface of the coating. The selection of a suitable adhesive is, therefore, an important factor in the quality of a coating for paper.

Vegetable protein materials have been extensively used as the adhesive binders for paper coatings and among these materials have been the vegetable protein isolates, typically soy isolate. Isolated soy protein is produced by the treatment of oil free soybean flakes with an alkaline solution to dissolve the protein which is removed from the non-soluble materials by filtration or centrifugation. The protein is then recovered from the solution by the addition of acid in order to precipitate the protein at its isoelectric point. The precipitated protein is then in an unhydrolyzed or generally unmodified state and can be dried and subsequently dispersed in an alkaline medium to form an adhesive binder for paper coating pigments.

The unhydrolyzed or unmodified soy protein isolates are less desirable as adhesives binders for paper coatings because of low solubility in weak alkaline solutions, high solution viscosity and sensitivity to heat, tending to form gels at temperatures of about 160° F. Because of these disadvantages, unmodified or non-hydrolyzed soy protein is usually modified in some way to lower the viscosity of coating compositions containing soy protein and increases the adhesive strength of the protein when it is dispersed in weak alkaline solutions. Modification or hydrolysis of the protein also reduces the sensitivity of the protein to heat. Modification of the protein usually consists of hydrolysis or treatment of the extracted protein in an aqueous dispersion with various alkaline reagents under controlled conditions of pH, temperature and time. These conditions dissociate the native or unmodified protein structure into smaller subunits thereby improving the suitability of this material as a binder in paper coatings.

Another means of modifying the protein is to treat the unmodified protein material with various chemical reagents in order to alter the rheological properties of coatings containing the modified protein material as a binder. Generally, the purpose of modifying the protein is to provide for increased fluidity of the protein material in alkaline dispersions and also much lower viscosity of coating compositions prepared with the modified protein material as an adhesive binder.

U.S. Pat. No. 2,862,918 describes such a modified protein wherein an isolated soy protein which has been hydrolyzed beyond the initial gel stage is acylated by treatment of the hydrolyzed soy protein material with a carboxylic acid anhydride, such as acetic anhydride to acylate the protein. The acylated or modified protein when dispersed in alkali has a lower viscosity and is suitable as an adhesive binder in pigment containing coating composition for paper and the like. Hydrolysis is carried out prior to or commensurate with the reaction with the carboxylic acid anhydride but in any event is sufficient to insure that the initial gel stage of the protein material has been traversed. Typical times of hydrolysis noted in the patent are between 4 and 6 hours.

U.S. Pat. No. 2,932,589 describes a paper coating composition and the process for producing the same in which a modified soy protein material is obtained by reaction of an isolated soy protein with a dicarboxylic acid anhydride such as phthalic anhydride. This phthalated protein when "cut" without alkali disperses more readily than untreated protein and has a lower viscosity than untreated isolated protein. This reduction in viscosity of the alkali dispersion enables one to produce a coating composition which has a high solids level, with relatively good fluidity for adhesive application to the surface to be coated. It is also noted that increased adhesiveness is a result of the modification of the protein material with the phthalic anhydride.

In spite of the improvements obtained by modification of the protein material as described in the above two references, it is still desirable to obtain a modified protein material having improved rheological properties but produced by a process which is easier and more convenient to perform than those of the prior art. These objectives were achieved in the present invention by the present process which fulfills these objectives wherein a modified protein material suitable as an adhesive binder is obtained which additionally results in an unexpected improvement in rheological and paper coating properties.

It is therefore an object of the present invention to produce a modified proteinaceous adhesive binder of good rheological properties.

It is a further object to produce a modified vegetable protein adhesive binder with good pigment binding and paper coating characteristics.

It is a further object to modify the vegetable protein adhesive material by a process to produce an adhesive binder that is both reliable and convenient to practice.

SUMMARY OF THE INVENTION

These and other objects are achieved in the present invention by the production of a modified vegetable protein adhesive binder having good rheological and paper coating characteristics. The present invention describes a process for the production of a modified protein adhesive binder suitable for use in pigment coating compositions wherein an alkaline protein dispersion is formed of the protein material and said dispersion is treated with a reducing agent in an amount sufficient to react with the disulfide bonds of the protein material in said dispersion. This initial treatment with a reducing agent is followed by reaction of the treated dispersion with an acid anhydride such as a dicarboxylic acid anhydride in an amount sufficient to modify the protein material such that alkali dispersions of the modified unhydrolyzed protein material have a relatively high viscosity but paper coating compositions with the modified protein material as the adhesive binder have relatively low viscosity for adhesive application to the surface to be coated.

Modification of the protein material in the manner described provides unexpected and surprising improvements in the properties of paper coating compositions prepared with the modified protein material of the present invention as an adhesive binder. Although improvement is achieved in pick strength, gloss, and water holding properties when latex is used in the coating, the most surprising improvement is the ink receptivity of the coating. Typically, most hydrolyzed proteins used as binders provide coatings with a relatively porous surface. When ink in a printing operation is applied, it penetrates the relatively porous surface of the coating. The printing will therefore have a relatively flat, unglossy appearance. The ink receptivity of coatings prepared with the modified protein material as a binder is unusual, particularly when the protein material, which is modified, maintained in a substantially unhydrolyzed condition prior to or during modification of the protein. The coatings are ink receptive but much less porous and the ink stands up more on the surface of the coating providing a glossy desirable appearance for the printing. This makes coatings prepared with the modified protein material of the present invention especially useful for high quality publication printing papers.

The exact reason why an improvement in the rheological properties of alkali dispersions or coating compositions containing the modified protein material of the present invention is achieved is not entirely understood but it is believed to be due to the specific combination of the treatment step wherein a reducing agent reacts with the disulfide bonds of the protein together with the absence of or a very limited degree of hydrolysis of the protein material. This is considered to be contrary to the teachings of the prior art, which as previously noted in describing the modification of protein materials by reaction with a carboxylic acid anhydride, it is stated that it is necessary to achieve hydrolysis beyond the gel stage or for at least 4 to 6 hours in order to obtain modified protein materials with suitable characteristics for use in paper coating compositions. Eliminating the need for extended hydrolysis in the protein material greatly simplifies the process yet produces a modified protein material suitable as an adhesive binder which provides paper coating composition of improved properties.

DESCRIPTION OF THE PREFERRED EMBODIMENTS

The present invention applies to a modified protein material suitable as an adhesive binder in paper coating compositions and more specifically to a vegetable protein material such as a vegetable protein isolate and most preferably to a soy isolate which is the most commonly produced isolated protein derived from vegetable plant sources. The present invention is therefore described with regard to a soy isolate since this is the primary area of concern for which the present invention was developed although it is apparent that other protein materials or vegetable protein materials can be employed and modified in a similar manner if desired. For purposes of explanation in the context of the present invention, an isolated soy protein material is initially prepared by treatment of defatted soybean flakes with an alkaline solution to solubilize the protein. The protein extract is then separated from the alkali insoluble solids by filtration or centrifugation. This protein extract or dispersion is typically used as the starting material in the process of the present invention. The extract or dispersion of the globular protein from the soy flakes will typically have a pH of between about 9.5 to 11.2. Alternatively, a dried soy protein isolate which has been previously isolated from the soy flakes may be used as the starting material by forming an alkaline dispersion of the dried protein material for carrying out the modification or chemical reaction of the protein material. Also, the particular type of alkaline material used to disperse the protein material is not critical to the practice of the present invention and in fact, any type of alkali or alkaline earth hydroxide, or other materials such as ammonium hydroxide may be readily employed in preparing the protein dispersion.

Following formation of the alkaline protein dispersion or extract, it is important to the present invention that the alkaline protein dispersion be initially treated with a reducing agent. Treatment with the reducing agent should be completed prior to reaction with the carboxylic acid anhydride. This treatment step is important in that the use of a reducing agent to treat the alkaline protein dispersion, together with modification by reaction with the carboxylic acid anhydride results in a modified protein material which has unusual rheological characteristics when employed as an adhesive binder in a pigment containing coating composition.

The purpose of the reducing agent is to react with the disulfide bonds of the solubilized protein material on at least a stoichiometric basis to effectively reduce the disulfide bonds and improve the reactivity of the protein material during treatment with the carboxylic acid anhydride. This prior treatment of the alkali dispersion effectively reduces or avoids the need for substantial hydrolysis of the protein material and furthermore provides unexpected improvements in rheological properties of the modified protein material when employed as an adhesive binder in coating compositions. The reducing agent is added to the alkaline dispersion on at least a stoichiometric basis to the level of disulfide bonds or sulfur containing amino acids in the solubilized protein dispersion, but in any event, in an amount sufficient to modify the disulfide bonds and improve reactivity of the resultant treated protein material during reaction with the carboxylic acid anhydride. The particular type of reducing agent that may be employed in the present invention is not critical although it is preferred that compounds with free or available sulfhydryl groups such as thioglycolic acid or salts of thioglycolic acid, most preferably, ammonium thioglycolate be used as a reducing agent for purposes of the present invention. Other suitable reducing agents include materials such as sulfur dioxide, sodium sulfide, sodium thiosulfate mercaptoethanol and other compounds containing free sulfhydryl groups.

Compounds with free or available sulfhydryl groups such as thioglycolic acid and salts of thioglycolic acid are particularly preferred as the reducing agent since relatively low amounts of these materials may be employed to reduce the disulfide bonds and typical levels depend entirely upon the disulfide bond level in the protein material since the reducing agent must be added on at least a stoichiometric basis. Preferred levels of materials such as thioglycolic acid, or ammonium thioglycolate are between about 0.2 and 2% and most preferably between 1 and 1.5% by weight of the dispersed protein or the protein level in the extract.

Following treatment of the alkaline protein dispersion with the reducing agent the treated protein dispersion is maintained in a substantially unhydrolyzed condition or may be hydrolyzed to a very limited extent. Maintenance of the treated protein in a substantially unhydrolyzed condition refers to the absence of any significant reduction in the individual sub unit molecular weight of the protein material. It is, in fact, preferred that hydrolysis of the treated alkaline protein dispersion be avoided and it is, in fact, unique that the substantially unhydrolyzed but modified protein material when employed as an adhesive binder has unusual rheological characteristics as compared to the prior art teachings which require extensive hydrolysis of the protein material prior to modification with a carboxylic acid anhydride. Therefore, in preparation of the modified adhesive binder of the present invention, the treated alkaline dispersion is simply reacted with the carboxylic acid anhydride in the manner described hereafter although a very limited degree of hydrolysis of the protein material may be carried out prior to modification. This limited amount of hydrolysis however is not sufficient to make a significant reduction in the individual sub unit molecular weight of the protein material, and in fact, the protein material is still in a substantially unhydrolyzed condition prior to modification. For example, hydrolysis at a pH of 10–12.5, temperature of 130°–145° F. for 30 minutes or less does not achieve a significant reduction in the individual sub unit molecular weight of the protein material and performing such a step may be desirable to improve viscosity of the coating composition.

Following very limited hydrolysis of the treated protein dispersion or if hydrolysis is avoided completely then the treated protein dispersion is reacted with a carboxylic acid anhydride to modify the protein material and impart unique rheological characteristics for the protein material when it is employed as a protein adhesive binder. Although any carboxylic acid anhydride or mixtures thereof are considered to be useful for purposes of the present invention, it is preferred to employ a dicarboxylic acid anhydride and preferably dicarboxylic acid anhydrides such as phthalic anhydride or succinic anhydride to modify the protein starting material of the present invention.

The carboxylic acid anhydride can be used to the treated alkaline protein dispersion in any suitable manner for reaction of the protein material and most conveniently, can be added in finely divided or ground form or in a solution with a solvent that does not react with any of the constituents of the reaction mixture. The exact amount of the carboxylic acid anhydride used is not critical and in fact is added in an amount sufficient to modify the protein material and impart the rheological characteristics desired in the modified protein material when it is employed as an adhesive binder in a pigment coating composition. These improved characteristics include improved pick strength, gloss, ink hold out, and water holding characteristics, together with a higher or better binding power with latex, also considered to be an essential and important ingredient in pigment containing coating compositions.

Preferred amounts of the carboxylic acid anhydride are at least about 5% by weight of the alkaline protein dispersion and preferably between about 7.5 and 10% by weight of the dispersed or protein level in the extract protein. It is also important that the pH be maintained to at least about 8 and preferably 9 to 10.5 in order to maintain reactivity of the amine groups on the protein molecule which is modified by a reaction with the carboxylic acid anhydride. The exact temperature and time of reaction is further not critical and because of this intimate relationship between time and temperature, relatively longer times of reaction would be required when low temperatures are employed, whereas relatively short reaction times would be required when somewhat higher temperatures are employed. The temperature for reaction is limited only by the fact that if too high of a temperature is employed, it may otherwise deleteriously effect the coating characteristics of the protein material and it is preferred that the temperature of reaction not exceed about 200° F. and most preferably be maintained below 150° F.

Following reaction of the protein material with the carboxylic acid anhydride, the modified protein material can be isolated by acid precipitation at the isoelectric point usually at a pH of 3.7 to 4.2 and recovered by washing, filtering, pressing or otherwise dewatering and then drying of the product. This provides a product with suitable shelf stability so that convenient incorporation in coating compositions may be carried out. The following examples represent specific but nonlimiting embodiments of the present invention.

EXAMPLE 1

200 pounds of solvent extraced soybean flakes were extracted with 1800 pounds of water to which has been added 2.5% by weight of the soy flakes of calcium hydroxide. The soybean flakes were extracted for 30 minutes with the alkaline solution and to solubilize the protein and the alkaline insoluble solids were then removed by centrifugation. The alkaline insoluble solids or extracted flakes were then re-extracted with an additional 1000 pounds of water which had been preheated to a temperature of 105° F. in order to solubilize additional protein in the extracted flakes. Following extraction, the insoluble solids or extracted flakes were again removed from the extract by centrifugation. The two alkali protein extracts were combined to provide an alkaline extract or dispersion having a protein content of 3.0% by weight and a pH of 10.7.

The combined alkaline protein extract was reacted with 1.0% by weight of the protein content of ammonium thioglycolate and which was stirred in the alkaline extract for 5–10 minutes. The treated alkali extract or dispersion was then reacted with 7.0% by weight of the level of protein of phthalic anhydride. The reaction with the phthalic anhydride was carried out for 30 minutes at a temperature of 130° F. and a pH of 9.8.

Following reaction of the treated alkaline extract of protein with the phthalic anhydride, the reaction mixture was then acidulated to a pH of about 4 by the addition of sulfuric acid to precipitate the modified protein material at its isoelectric point. The precipitated modified protein was then concentrated by centrifugation and dried at a temperature of 150°–160° F. for one to two hours to yield the substantially unhydrolyzed and modified protein adhesive binder of the present invention.

EXAMPLE 2

300 pounds of solvent extracted soybean flakes were extracted with 2700 pounds of water which had been preheated to a temperature of 105° F. to which had been added 2.5% by weight of the soy flakes of calcium hydroxide. The flakes were extracted for 30 minutes and the insoluble solids removed by centrifugation. The insoluble solids or extracted flakes were then re-extracted with an additional 1500 pounds of water preheated to a temperature of 105° F. and the insoluble solids immediately removed by centrifugation. The two protein extracts or dispersions were then combined to provide an alkaline protein dispersion extract or having a protein content of 2.95% by weight at a pH of 10.6. The combined alkaline extract was then reacted with 0.5% by weight of the protein level of ammonium thioglycolate and stirred for an additional 2 to 3 minutes. Added to the treated extract after reaction with the ammonium thioglycolate was 9% by weight of the protein level of sodium hydroxide and the treated alkaline extract was heated at a temperature of 145° F. for about 30 minutes. This was necessary in order to hydrolyze the soy protein to a very limited extract, partial hydrolysis was arrested by the addition of sulfuric acid after 30 minutes to adjust the pH to 10.5.

Following hydrolysis, an additional 1% by weight of ammonium thioglycolate by weight of the protein level in the extract was added to the reaction mixture. The partially but substantially hydrolyzed dispersion or extract was then reacted with 7.5% by weight of the protein extract level of phthalic anhydride and the reaction of phthalic anhydride was carried out at a temperature of 145° F. for a period of about 30 minutes and at a pH of 9.8.

Following reaction with phthalic anhydride, the reaction mixture was acidulated to a pH of about 4 by the addition of sulfuric acid to precipitate the modified, partially hydrolyzed protein at its isoelectric point. The precipitated modified, partially but substantially unhydrolyzed protein was concentrated by centrifugation and dried at 150°–160° F. for one to two hours in order to produce the partially hydrolyzed modified protein adhesive binder of the present invention.

EXAMPLE 3

The modified protein binders produced in Examples 1 and 2 were evaluated as an adhesive binder in two different types of pigment coating compositions for paper.

At the same time a comparison was made to a modified binder prepared in a substantially identical manner but in which substantial hydrolysis had been carried out. Specifically, such a binder was prepared generally in accordance with Example 2 but hydrolysis was carried out by the use of 9% by weight of the protein level of sodium hydroxide and heating at a temperature of 140° F. for 90 minutes. This was sufficient to substantially hydrolyze the protein. This modified binder was identified as a modified, substantially hydrolyzed control. Another protein adhesive binder which is a hydrolyzed but unmodified soy protein isolate was also used for comparison and identified as a hydrolyzed, unmodified control.

Paper coating compositions containing the modified protein material of Examples 1 and 2 and the controls were prepared wherein the protein material was the only binder. This was prepared by mixing 15 parts of the protein material from each example with 100 parts of clay to the total solids level indicated in Table 1. This coating was identified as Coating A.

A second coating was prepared by mixing 5 parts of the protein material with 10 parts of a styrene-butadiene latex, and 100 parts of clay to the total solids level indicated in Table 1. This coating was identified as Coating B.

TABLE 1

| | Coating Viscosity (CPS) With Modified Protein Material Of Examples 1–2 And Control Samples As Binder | | | | | | | |
|---|---|---|---|---|---|---|---|---|
| | Modified Protein Of Example 1 | | Modified Protein Of Example 2 | | Substantially Hydrolyzed Modified Protein Control | | Hydrolyzed Unmodified Protein Control | |
| RVT Speed RPM | Coating A (38% Solids) | Coating B (47.4% Solids) | Coating A (47.4% Solids) | Coating B (47.4% Solids) | Coating A (47.4% Solids) | Coating B (47.4% Solids) | Coating A (47.4% Solids) | Coating B (47.4% Solids) |
| 10 | 10,000 | 5,600 | 8,200 | 500 | 2,700 | 210 | 5,400 | 980 |
| 20 | 5,600 | 3,300 | 4,950 | 350 | 1,500 | 200 | 3,350 | 610 |
| 50 | 2,760 | 1,680 | 2,760 | 228 | 660 | 128 | 1,940 | 344 |
| 100 | 1,640 | 1,028 | 1,790 | 190 | 475 | 114 | 1,250 | 249 |

It may be seen that coatings which contained the modified substantially unhydrolyzed protein material of the present invention as the only binder had a relatively high viscosity, although when the latex was included, the viscosity was substantially reduced and the unhydrolyzed modified protein material of the present invention was very compatible with latex and more comparable to the hydrolyzed modified or unmodified control samples as a coating binder combination.

The modified protein materials of Examples 1–2 and the control samples in Coatings A and B as described above were applied to paper with a draw down bar. About 14–15 gm/m² of coating was applied to each sheet of paper. The coated paper was evaluated for gloss by Method T-452, these being standard methods of measurement by the *Technical Association of Pulp and Paper Industries* (TAPPI). The IGT value for each coating was also measured. This measures the force that the coating will withstand with certain types of ink used in printing. The ink receptivity is measured by the % drop for K & N ink. The smaller the number, the more nonporous the coating is and therefore the less penetration of the ink into the coating. The coating evaluation of Coatings A and B prepared with the modified protein material of Examples 1–2 and the control samples are set forth in Table 2.

TABLE 2

| | Properties Of Coatings With Protein Material Of Examples 1–2 And Control Samples | | | | | | | |
|---|---|---|---|---|---|---|---|---|
| | Modified Protein Material Of Example 1 | | Modified Protein Material of Example 2 | | Substantially Hydrolyzed Modified Protein Control | | Hydrolyzed Unmodified Protein Control | |
| | Coating A | Coating B | Coating A | Coating B | Coating A | Coating B | Coating A | Coating B |
| Opacity % | 91.8 | 91.6 | 91.2 | 91.0 | 91.4 | 90.9 | 91.6 | 91.6 |
| 75° Gloss % | 50.8 | 68.9 | 64.0 | 77.9 | 66.0 | 78.0 | 65.3 | 77.4 |

TABLE 2-continued

| | Properties Of Coatings With Protein Material Of Examples 1-2 And Control Samples | | | | | | | |
|---|---|---|---|---|---|---|---|---|
| | Modified Protein Material Of Example 1 | | Modified Protein Material of Example 2 | | Substantially Hydrolyzed Modified Protein Control | | Hydrolyzed Unmodified Protein Control | |
| | Coating A | Coating B | Coating A | Coating B | Coating A | Coating B | Coating A | Coating B |
| (Calendered 3 Nips) Brightness % | 76.3 | 76.1 | 75.3 | 76.1 | 75.9 | 75.6 | 75.4 | 76.2 |
| K&N Ink % Drop | 7.95 | 5.65 | 12.0 | 8.6 | 29.2 | 13.6 | 23.2 | 18.6 |
| IG M Speed 5 Ink | 173 | 201 | 161 | 185 | 134 | 223 | 200 | 210 |
| 50 KG (cm/sec.) 6 Ink | 134 | 178 | 145 | 170 | — | 164 | — | — |

The above results indicate the modified protein materials of the present invention function well as adhesive binders in pigment coatings for paper, particularly when latex is used in conjunction with it.

The ink hold out or ink receptivity values are very unusual. The modified protein materials of Examples 1 and 2 have very low values representing very little ink penetration into the coating. As the modified protein material was more completely hydrolyzed, the ink penetration increased. Furthermore, if a conventional hydrolyzed but unmodified protein material was used as the adhesive binder very high ink penetration into the coating was observed. It is therefore apparent that the modified protein material of the present invention represents distinct improvement over the prior art in the production of modified protein materials as adhesive binders for pigment coating compositions for paper.

While the present invention has been described with regard to the specific embodiments set forth above, it should be understood that it is intended to include within the scope of the present invention all equivalents thereto.

What is claimed is:

1. A process for the production of a modified vegetable protein adhesive binder comprising:
    a. forming an alkaline dispersion of a vegetable protein material having reactive disulfide bonds;
    b. treating said dispersion with a reducing agent in an amount sufficient to react with the disulfide bonds of said protein material,
    c. reacting said treated dispersion with a carboxylic acid anhydride in an amount sufficient to modify the protein material wherein the pH is maintained between 9 and 10.5 during said reaction and treatment.

2. The process of claim 1 wherein the alkaline dispersion has a pH between about 10 and 12.

3. The process of claim 1 wherein the alkaline protein dispersion has a proteinaceous solids content of between about 0-14% by weight.

4. The process of claim 1 wherein said reducing agent is a compound having a free sulfhydryl group.

5. The process of claim 1 wherein said reducing agent is selected from the group consisting of thioglycolic acid, salts of thioglycolic acid, sulfur dioxide, sodium sulfide, and sodium thiosulfate.

6. The process of claim 1 wherein said reducing agent is ammonium thioglycolate.

7. The process of claim 1 wherein said amount of reducing agent is at least a stoichiometric amount with the disulfide bond level of said protein material.

8. The process of claim 1 wherein the amount of reducing agent is between about 0.5 and 2% by weight of the alkaline dispersion.

9. The process of claim 8 wherein the amount of reducing agent is between about 1 and 1.5% by weight of the protein dispersion.

10. The process of claim 1 wherein said carboxylic acid anhydride is a dicarboxylic acid anhydride.

11. The process of claim 10 wherein the dicarboxylic acid anhydride is selected from the group consisting of succinic anhydride and phthalic anhydride.

12. The process of claim 1 wherein the amount of carboxylic acid anhydride is at least about 5% by weight of the protein dispersion.

13. The process of claim 12 wherein the amount of carboxylic acid anhydride is between about 7.5 and 10% by weight of the alkaline protein dispersion.

14. The process of claim 1 including the step of adjusting the pH of the treated dispersion of the isoelectric point to precipitate the modified protein material.

15. The process of claim 14 including the step of dewatering the precipitated, modified protein material.

16. A process for the production of a modified vegetable protein adhesive binder comprising:
    a. forming an alkaline dispersion of a substantially unhydrolyzed vegetable protein material having reactive disulfide bonds;
    b. treating said dispersion with a reducing agent in an amount sufficient to react with the disulfide bonds of said protein material,
    c. maintaining said protein material in a substantially unhydrolyzed condition, and
    d. reacting said treated dispersion with a carboxylic acid anhydride in an amount sufficient to modify the protein material wherein the pH is maintained between 9 and 10.5 during said reaction and treatment.

17. The process of claim 16 wherein the alkaline dispersion has a pH of between about 10 and 12.

18. The process of claim 16 wherein the alkaline protein dispersion has a proteinaceous solids content of between about 0-14% by weight.

19. The process of claim 16 wherein said reducing agent is a compound having a free sulfhydryl group.

20. The process of claim 16 wherein said reducing agent is selected from the group consisting of thioglycolic acid, salts of thioglycolic acid, sulfur dioxide, sodium sulfide, and sodium thiosulfate, mercaptoethanol and other compounds containing free sulfhydryl groups.

21. The process of claim 16 wherein said reducing agent is ammonium thioglycolate.

22. The process of claim 16 wherein said amount of reducing agent is at least a stoichiometric amount with the disulfide bond level of said protein material.

23. The process of claim 16 wherein the amount of reducing agent is between about 0.5 and 2% by weight of the alkaline dispersion.

24. The process of claim 23 wherein the amount of reducing agent is between about 1 and 1.5% by weight of the protein dispersion.

25. The process of claim 16 wherein said carboxylic acid anhydride is a dicarboxylic acid anhydride.

26. The process of claim 25 wherein the dicarboxylic acid anhydride is selected from the group consisting of succinic anhydride and phthalic anhydride.

27. The process of claim 16 wherein the amount of carboxylic acid anhydride is at least about 5% by weight of the protein dispersion.

28. The process of claim 27 wherein the amount of carboxylic acid anhydride is between about 7.5 and 10% by weight of the alkaline protein dispersion.

29. The process of claim 16 including the step of adjusting the pH of the reacted dispersion to the isoelectric point to precipitate the modified protein material.

30. The process of claim 29 including the step of dewatering the precipitated, modified protein material.

31. The product produced by the process of claim 1.

32. The product produced by the process of claim 16.

33. A process for the production of a modified vegetable protein adhesive binder comprising:
 a. forming an alkaline dispersion of a substantially unhydrolyzed vegetable protein material having reactive disulfide bonds;
 b. treating said dispersion with a reducing agent in an amount sufficient to react with the disulfide bonds of said protein material;
 c. hydrolyzing said dispersion for not more than 30 minutes; and
 d. reacting said treated and hydrolyzed dispersion with a carboxylic acid anhydride in an amount sufficient to modify the protein material wherein the pH is maintained between 9 and 10.5 during said reaction and treatment.

* * * * *